US012688778B2

(12) United States Patent
Geitz et al.

(10) Patent No.: US 12,688,778 B2
(45) Date of Patent: Jul. 21, 2026

(54) CELLULAR NETWORK FOR EFFICIENT AND RELIABLE REMOTE OPERATION OF A VEHICLE FLEET

(71) Applicant: Deutsche Telekom AG, Bonn (DE)

(72) Inventors: Marc Geitz, Hagen (DE); Dominik Schnieders, Aachen (DE)

(73) Assignee: Deutsche Telekom AG, Bonn (DE)

( * ) Notice: Subject to any disclaimer, the term of this patent is extended or adjusted under 35 U.S.C. 154(b) by 34 days.

(21) Appl. No.: 18/888,196

(22) Filed: Sep. 18, 2024

(65) Prior Publication Data

US 2025/0111781 A1 Apr. 3, 2025

(30) Foreign Application Priority Data

Oct. 2, 2023 (EP) ..................................... 23201113

(51) Int. Cl.
*G08G 1/00* (2006.01)
*G01C 21/00* (2006.01)
(52) U.S. Cl.
CPC ........... *G08G 1/20* (2013.01); *G01C 21/3819* (2020.08); *G01C 21/3822* (2020.08)
(58) Field of Classification Search
CPC .. G08G 1/20; G01C 21/3819; G01C 21/3822; G01C 21/3461; G01C 21/3407; G05D 1/222; G05D 1/6987; G05D 2105/22; G05D 2107/13; G05D 2109/10; G05D 1/226

USPC ......................................................... 701/117
See application file for complete search history.

(56) References Cited

U.S. PATENT DOCUMENTS

2019/0383624 A1* 12/2019 Magzimof ........... H04B 17/373
2022/0228874 A1* 7/2022 Nader .............. G08G 1/096844

* cited by examiner

*Primary Examiner* — Maceeh Anwari
(74) *Attorney, Agent, or Firm* — LEYDIG, VOIT & MAYER, LTD.

(57) ABSTRACT

A method includes: remotely operating, by a teleoperation server, a vehicle fleet on a road network via wireless connections provided by a cellular network; receiving, by a network node of the cellular network, a route request from the teleoperation server, wherein the received route request comprises a starting position of a vehicle of the vehicle fleet, a target location to be reached by the vehicle, a teleoperation route connecting the target location to the starting position and a travel time of the vehicle; determining, by the network node, a teleoperation route for the vehicle from the requested starting position to the requested target location; and based on the cellular network not allowing for safe remote operation of the vehicle along the requested teleoperation route during the requested travel time, transmitting, by the network node, a route suggestion to the teleoperation server, the transmitted route suggestion comprising the determined teleoperation route.

16 Claims, 2 Drawing Sheets

CELLULAR NETWORK FOR EFFICIENT AND RELIABLE REMOTE OPERATION OF A VEHICLE FLEET

CROSS-REFERENCE TO PRIOR APPLICATION

This application claims benefit to European Patent Application No. EP 23 201 113.0, filed on Oct. 2, 2023, which is hereby incorporated by reference herein.

FIELD

The invention relates to a method for operating a cellular network, wherein a teleoperation server remotely operates a vehicle fleet on a road network via a wireless connection provided by the cellular network and a network node of the cellular network receives a route request from the teleoperation server, the received route request comprising a starting position of a vehicle of the vehicle fleet, a target location to be reached by the vehicle, a teleoperation route connecting the target location to the starting position and a travel time of the vehicle. The invention further relates to a network node for a cellular network and a computer program product.

BACKGROUND

A vehicle fleet includes a plurality of vehicles provided for being ordered and individually used by a plurality of customers on a predetermined road network, e.g., a road network of a town. The road network comprises a plurality of roads connected to each other at nodes of the road network.

A customer usually orders a vehicle of the vehicle fleet indicating a starting position within the road network and, possibly, a pickup time, where and if applicable when the customer intends to start using the vehicle. Traditionally, a physical driver, i.e., a person, e.g., a taxi driver drives the ordered vehicle to arrive at the indicated starting position at the indicated pickup time, allows the customer to enter the vehicle, drives the vehicle to a target location within the road network indicated by the customer and allows the customer to exit the vehicle after having reached the target location.

However, having each vehicle of the vehicle fleet driven by a physical driver is very expensive.

A vehicle fleet may also include a fleet of mobile robots, mobile cranes, mobile containers to be remotely operated on a path network of, e.g., a factory or a port.

As cellular networks become more powerful, vehicles are going to be driven, i.e., operated remotely without a physical driver arranged in the vehicle. Instead, a remote driver receives real-time data from the vehicle and transmits commands to the vehicle via wireless connections provided by a cellular network, the received real-time data comprising video and audio data captured by sensors of the vehicle and the transmitted commands causing the vehicle to travel on a road network.

Accordingly, a plurality of physical drivers may be replaced by a few central operators, each central operator using a teleoperation server configured for remotely operating the vehicles of the vehicle fleet. The teleoperation server, on the one hand, allows for a more economic operation of the vehicle fleet. On the other hand, an efficiency of the vehicle fleet may be increased. A customer drives the ordered vehicle by himself/herself from the starting position to the target location while the central operator remotely operates the ordered vehicle for moving it in due time to the starting position indicated by the customer.

However, an availability and/or a coverage of the cellular network usually is neither spatially homogeneous over the road network nor constant over time at a road or a node of the road network. As a result, parts of the road network may at least temporarily lack a sufficient provision of wireless connections which hinders or at least adversely affects remote operation of the vehicle fleet.

SUMMARY

In an exemplary embodiment, the present invention provides a method. The method includes: remotely operating, by a teleoperation server, a vehicle fleet on a road network via wireless connections provided by a cellular network; receiving, by a network node of the cellular network, a route request from the teleoperation server, wherein the received route request comprises a starting position of a vehicle of the vehicle fleet, a target location to be reached by the vehicle, a teleoperation route connecting the target location to the starting position and a travel time of the vehicle; determining, by the network node, a teleoperation route for the vehicle from the requested starting position to the requested target location; and based on the cellular network not allowing for safe remote operation of the vehicle along the requested teleoperation route during the requested travel time, transmitting, by the network node, a route suggestion to the teleoperation server, the transmitted route suggestion comprising the determined teleoperation route.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
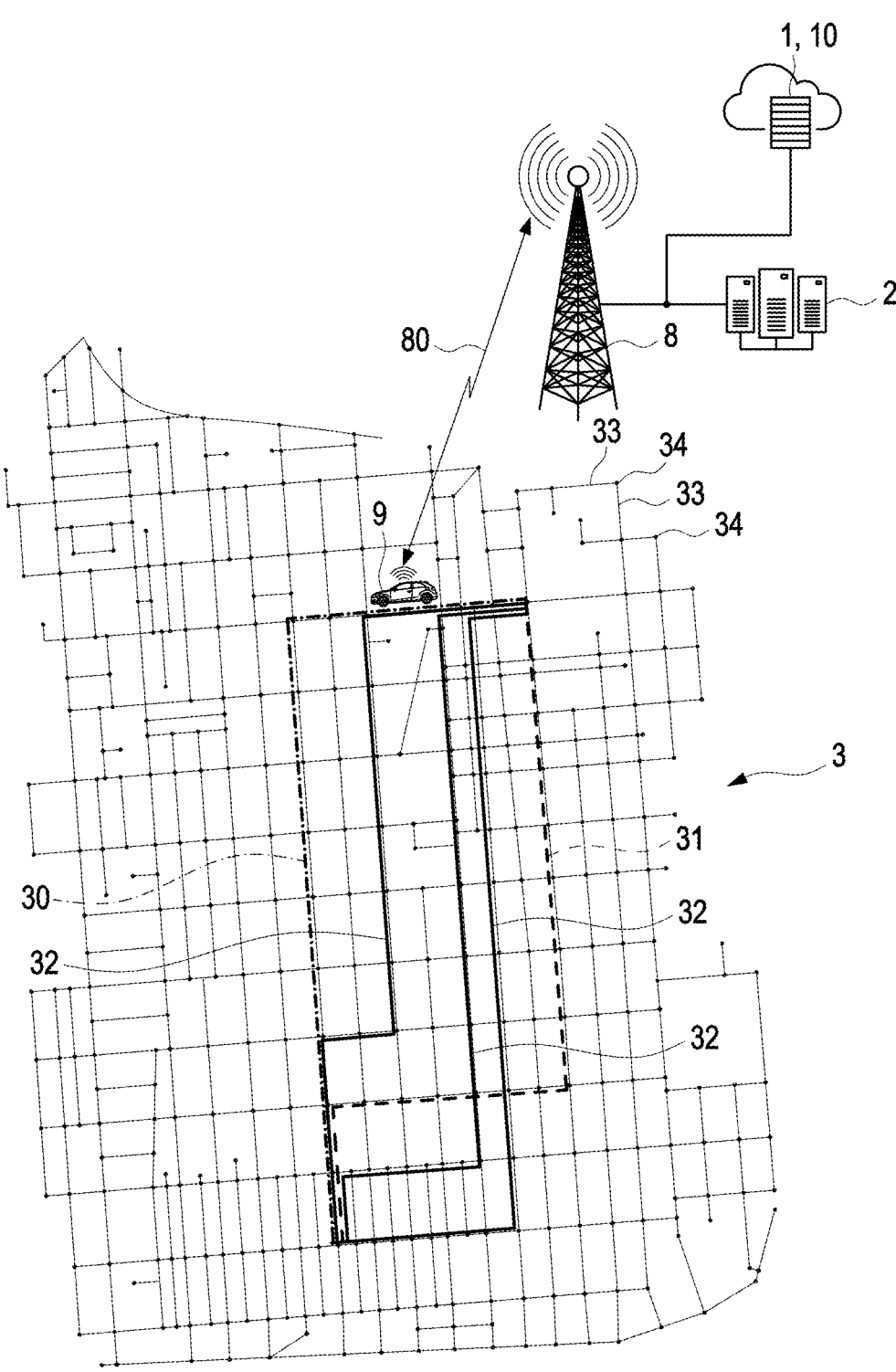
FIG. 1 schematically shows a cellular network with a network node according to an embodiment of the invention.

Exemplary embodiments of the invention provide a method for operating a cellular network which allows for efficient and reliable remote operation of a vehicle fleet on a road network. Exemplary embodiments of the invention further provide a network node for a cellular network and a computer program product.

In an exemplary embodiment, the invention provides a method for operating a cellular network, wherein a teleoperation server remotely operates a vehicle fleet on a road network via wireless connections provided by a cellular network and a network node of the cellular network receives a route request from the teleoperation server, the received route request comprising a starting position of a vehicle of the vehicle fleet, a target location to be reached by the vehicle, a teleoperation route connecting the target location to the starting position and a travel time of the vehicle. The road network may be a road network of a town and comprises a plurality of nodes and roads connecting the nodes.

The vehicle fleet comprises a plurality of vehicles. Each vehicle is configured to be remotely operated and to travel along the roads of the road network. The teleoperation route comprises a sequence of roads of the road network to be traveled along by the vehicle sequentially.

The teleoperation server is connected to the cellular network and may be used by an operator of the vehicle fleet, i.e., a tele drive operator or tele operator, for remotely operating the vehicle fleet. The network node forms part of the cellular network and is provided by an operator of the cellular network, i.e., a mobile network operator (MNO). The cellular network may be one cellular network out of a plurality of different cellular networks, each cellular network at least partially covering the road network. The different cellular networks may overlap at least partially.

The route request is a data message indicating the starting position, the target location, the teleoperation route and the travel time. The travel time comprises a pickup time and a travel duration and specifies a future time interval.

According to the invention, the network node determines an optimal teleoperation route allowing for a safe remote operation of the vehicle from the requested starting position to the requested target location and transmits a route suggestion to the teleoperation server when the cellular network does not allow for a safe remote operation of the vehicle along the requested teleoperation route during the requested travel time, the transmitted route suggestion comprising the optimal teleoperation route. The network node checks an availability of wireless connections along the requested teleoperation route during the requested travel time. In case the availability along the requested teleoperation route is insufficient for a safe remote operation of the vehicle the teleoperation server determines the optimal teleoperation route to be a route covered by the cellular network sufficiently for a safe remote operation of the vehicle.

It is noted that the remotely operated vehicle traveling on the teleoperation node has to slow down or even stop when the wireless connection is insufficient for a remote operation. The vehicle may even be damaged from a collision caused by the insufficient wireless connection. Exemplary embodiments of a method according to the invention allow for efficient and reliable operation of the vehicle fleet by avoiding or at least reducing said risks.

Preferably, the network node determines a plurality of intermediate teleoperation routes in between the requested teleoperation route and the determined optimal teleoperation route by applying random variations generated by a Monte Carlo algorithm to the requested teleoperation route or the determined optimal teleoperation route, the transmitted route suggestion comprising the determined intermediate teleoperation routes. Each intermediate teleoperation route is determined in order to provide an availability of wireless connections sufficient for a safe remote operation of the vehicle. For instance, the intermediate teleoperation routes may be determined via a greedy algorithm. The intermediate teleoperation routes may have different lengths and/or different qualities of available wireless connections. The plurality of intermediate teleoperation nodes allows the teleoperation server, more specifically the operator using the teleoperation server, for a choice.

The network node may receive a route decision from the teleoperation server, the route decision comprising a suggested teleoperation route, store the suggested teleoperation route and cause the cellular network to reserve corresponding spectral resources of radio cells passed through by the suggested teleoperation route. Each stored teleoperation route may be understood to be a teleoperation route approved by the network node. The spectral resources may be a plurality of resource blocks (RB) for respective time intervals. The spectral resources are reserved, i.e. blocked for respective travel times of the vehicle within the radio cells, i.e., the total travel duration is divided in subsequent partial travel durations each partial travel duration associated with a radio cell. Of course, blocked spectral resources not used for remotely operating the vehicle may readily be used otherwise. The number of resource blocks to be reserved depends on a position of the vehicle in the radio cell, particularly relative to a position of a base transceiver station generating the radio cell. For instance, remotely operating the vehicle at a greater distance from the base transceiver station, generally requires more resource blocks than remotely operating the vehicle at a smaller distance therefrom.

In an embodiment, the network node stores the requested teleoperation route, causes the cellular network to reserve corresponding spectral resources of radio cells passed through by the requested teleoperation route and transmits a route confirmation to the teleoperation server when the cellular network allows for a safe remote operation of the vehicle along the requested teleoperation route during the requested travel time. The network node checks an availability of wireless connections along the requested teleoperation route during the requested travel time. In case the availability along the requested teleoperation route is sufficient for a safe remote operation of the vehicle the teleoperation server is not required to determine an optimal teleoperation route. Of course, the teleoperation server may still determine the optimal teleoperation route.

Determining the optimal teleoperation route may also comprise verifying the requested teleoperation route. The network node may additionally determine a teleoperation route without taking into account an availability of wireless connections along the teleoperation route. Verifying the requested teleoperation route comprises comparing the teleoperation route with the requested teleoperation route wherein the verification is successful when the teleoperation route and the requested teleoperation route at least substantially coincide, i.e., differ slightly at most.

Determining the optimal teleoperation route preferably comprises assigning weights to sections of roads of the road network and applying a weighted shortest path algorithm to the road network, the weighted shortest path algorithm evaluating respective costs of routes connecting the requested target location to the requested starting position by summing up weights assigned to sections of roads of the route. The higher is the availability of wireless connections along a section of a road, the lower is the weight assigned to the section. In contrast, the lower the availability of wireless connections along a section of the road, the higher the weight assigned to the section. The cost of a route equals a sum of weights assigned to sections of the route. The optimal teleoperation route is determined to be both short and cheap.

The weights may be assigned dependent on attributes of nodes and/or roads of the road network, the attributes specifying the road network and the cellular network. The nodes and roads of the road network correspond to nodes and edges of a mathematical graph. The nodes may be crossings, roundabouts, junctions, significant places alongside a road and the like.

Exemplarily, the attributes specifying the cellular network may comprise a radio coverage along a road section, a maximum bit rate along a road section, a minimum guaranteed bitrate along a road section and/or a guaranteed maximum latency along a road section. Said attributes specify a quality of the cellular network along the road section which is readily accessible for the network node as part of the cellular network. In case there is a plurality of overlapping different cellular networks along the road section attributes of the respective best cellular network are relevant for the determination. In case the attributes of the cellular network vary along the road section the respective worst attribute value is relevant for the determination. The overlapping different cellular network may even cooperate in determining the optimal teleoperation route.

In an embodiment, the attributes specifying the road network may comprise a location of a node, a type of a node, a length of a road, a category of a road, a maximum velocity along a road section, a current traffic situation along a road section, an air quality along a road section, a number of lanes of a road section, a direction of a road. Said attributes specify a quality of the traffic along the road section. Categories of the road comprise a freeway, a federal highway, a highway, an urban road, a residential street and the like. Current traffic situations comprise a traffic jam, a traffic congestion, a lane closure and the like. Directions of the road comprise one-way and two-way.

It is noted that some attributes usually vary over time. Of course, values of these attributes during the requested travel time are relevant for determining teleoperation routes.

In a favorable embodiment, the attributes specifying the cellular network are predicted by an artificial neural network and/or via a time series of historic data. For instance, a load of the cellular network may vary on a regular and, hence, predictable basis, e.g., showing a daily rhythm and/or a weekly rhythm. The artificial neural network is configured for recognizing time patterns of the attributes. Time patterns may be alternatively or additionally recognized from historic data by applying traditional pattern recognition algorithms to historic data, i.e., by time series analysis.

The network node may determine a key figure for each determined teleoperation route and assigns the determined key figure to the determined teleoperation route, the transmitted route suggestion comprising the assigned key figure. The key figure facilitates choosing between different determined teleoperation routes, i.e., the optimal teleoperation route and each intermediate teleoperation route. Of course, a plurality of different key figures may be determined by the network node.

Exemplarily, the network node may determine a difference of a travel time along the determined teleoperation route from the requested travel time, a difference of a route length of the determined teleoperation route from a route length of the requested teleoperation route and/or a probability of an undisturbed travel along the determined teleoperation route as the key figure. In other words, the key figure indicates an amount of how much longer it takes to travel along the determined teleoperation route, how much longer a travel distance along the determined teleoperation route is from the starting position to the target location and/or how high the risk of a disturbance is along the determined teleoperation route.

The probability of a disturbance may be calculated assuming a Gaussian distribution for the number IsRB of resource blocks available along a road of the road network. In case the number MinRB of resource blocks required for an undisturbed travel is higher than IsRB, i.e., MinRB>IsRB, a disturbance probability is 100%. Otherwise, the disturbance probability is lower than 100%. MinRB depends on current states of the road network and the traveling vehicle, respectively, while IsRB depends on a current availability of the cellular network.

For instance, $(\text{IsRB}-\text{MinRB})/\text{MinRB}=1\sigma$ results in a disturbance probability of 68%, $(\text{IsRB}-\text{MinRB})\text{MinRB}=2\sigma$ results in a disturbance probability of 5% and $(\text{IsRB}-\text{MinRB})/\text{MinRB}=3\sigma$ results in a disturbance probability lower than 1% wherein $\sigma$ is the so-called standard deviation of the Gaussian distribution.

Preferably, a teleoperation application executed by the teleoperation server and each vehicle of the vehicle fleet is caused by the cellular network to automatically adapt a data rate to a current bit rate of the wireless connection and/or the teleoperation server is preferably configured as an edge server. The teleoperation application is a distributed real-time or near-real-time application. The teleoperation application receives control signals related to the current bit rate from the cellular network and adapts the data rate dependent on the received control signals. Thus, the teleoperation application automatically and immediately adapts to a current availability of the cellular network in order to minimize a latency and/or a jitter of the wireless connection. The jitter is a variation of the latency over time. A high latency and/or a high jitter is caused by permanently and/or temporarily overloaded network queues.

The adaptability of the teleoperation application allows for ignoring any attribute related to the latency. For instance, the teleoperation application and the cellular network may implement a Low Latency Low Loss Scalable Throughput (L4S) protocol for interaction.

The edge comprises a part of the cellular network within few hops from, i.e., a logical neighborhood of relevant base transceiver stations (BTSs) of the cellular network. Arranging the teleoperation server close to a relevant base transceiver station significantly reduces a round-trip-time (RTT) of a communication between the teleoperation server and the vehicles of the vehicle fleet.

In an embodiment, the requested teleoperation route is determined by the teleoperation server and/or by minimizing a length of the route. As the teleoperation server has no access to relevant data concerning the cellular network, a traditional shortest path algorithm may be applied by the teleoperation server for determining the teleoperation route to be requested.

Of course, the received route request may comprise respective starting positions, target locations, routes and travel times of a plurality of vehicles. In other words, the teleoperation server is configured for simultaneously operate a plurality of vehicles and, particularly, the vehicle fleet as a whole.

Another aspect of the invention is a network node for a cellular network. The network node is a computing device to be immediately connected to the cellular network. The network node may be an existing network node or an additional network node.

According to the invention, the network node is configured for carrying out a method according to an embodiment of the invention together with the teleoperation server remotely operating a vehicle fleet on a road network via wireless connections provided by the cellular network. The network node allows for a teleoperation server of a teleoperation operator efficient and reliable remote operation of a vehicle fleet on a road network.

A third aspect of the invention is a computer program product, comprising a digital storage medium storing a program code. The digital storage medium may be configured as a CD (Compact Disc), a DVD (Digital Versatile Disk), a USB (Universal Serial Bus) stick, a hard drive, a RAM (Random Access Memory) chip, a cloud storage, or the like.

According to the invention, the program code causes a computing device to carry out a method according to an embodiment of the invention together with the teleoperation server as the network node when being executed by a processor of the computing device. In other words, the computer program product enables the computing device to participate in a method according to an exemplary embodiment of the invention as the network node and to allow for a teleoperation server efficient and reliable remote operation of a vehicle fleet on a road network.

It is an advantage of a method according to an exemplary embodiment of the invention that efficient and reliable remote operation of a vehicle fleet is ensured. Apart from that, mobile network operators may open a new business field and help in developing an alternative traffic concept for towns and reducing an individual traffic in cities.

It will be appreciated that the features described previously and to be described subsequently may be used not only in the indicated combinations but also in different combinations or on their own without leaving the scope of the present invention.

The invention is described in detail via an exemplary embodiment and with reference to the drawings. Like components are indicated by like reference numerals throughout the drawings.

FIG. 1 schematically shows a cellular network 8 with a network node 1 according to an embodiment of the invention. The cellular network 8 is illustrated simply as an antenna of a base transceiver station (BTS) of the cellular network 8. A teleoperation server 2 is connected to the cellular network 8.

The teleoperation server 2 is configured for remotely operating a vehicle fleet on a road network 3 via wireless connections 80 provided by the cellular network 8. Furthermore, the teleoperation server 2 is preferably configured as an edge server.

For sake of simplicity, a single vehicle 9 of the vehicle fleet connected to the cellular network 8 via a single wireless connection 80 is illustrated. The road network 3 comprises a plurality of nodes 34 and a plurality of roads 33 each road 33 connecting to adjacent nodes 34. Exemplary teleoperation routes 30, 31, 32 for the vehicle 9 are also illustrated.

The network node 1 is suitable for the cellular network 8 and may comprise an artificial neural network 10. The network node 1 is configured for carrying out a method according to an embodiment of the invention together with the teleoperation server 2 remotely operating the vehicle fleet on the road network 3 via wireless connections 80 provided by the cellular network 8.

The network node 1 may be configured as a computing device implemented via a computer program product. The computer program product comprises a digital storage medium storing a program code. The program code causes the computing device to carry out a method according to an exemplary embodiment of the invention together with the teleoperation server 2 as the network node 1 when being executed by a processor of the computing device. The method according to an exemplary embodiment is described in detail below.

Figure 2:
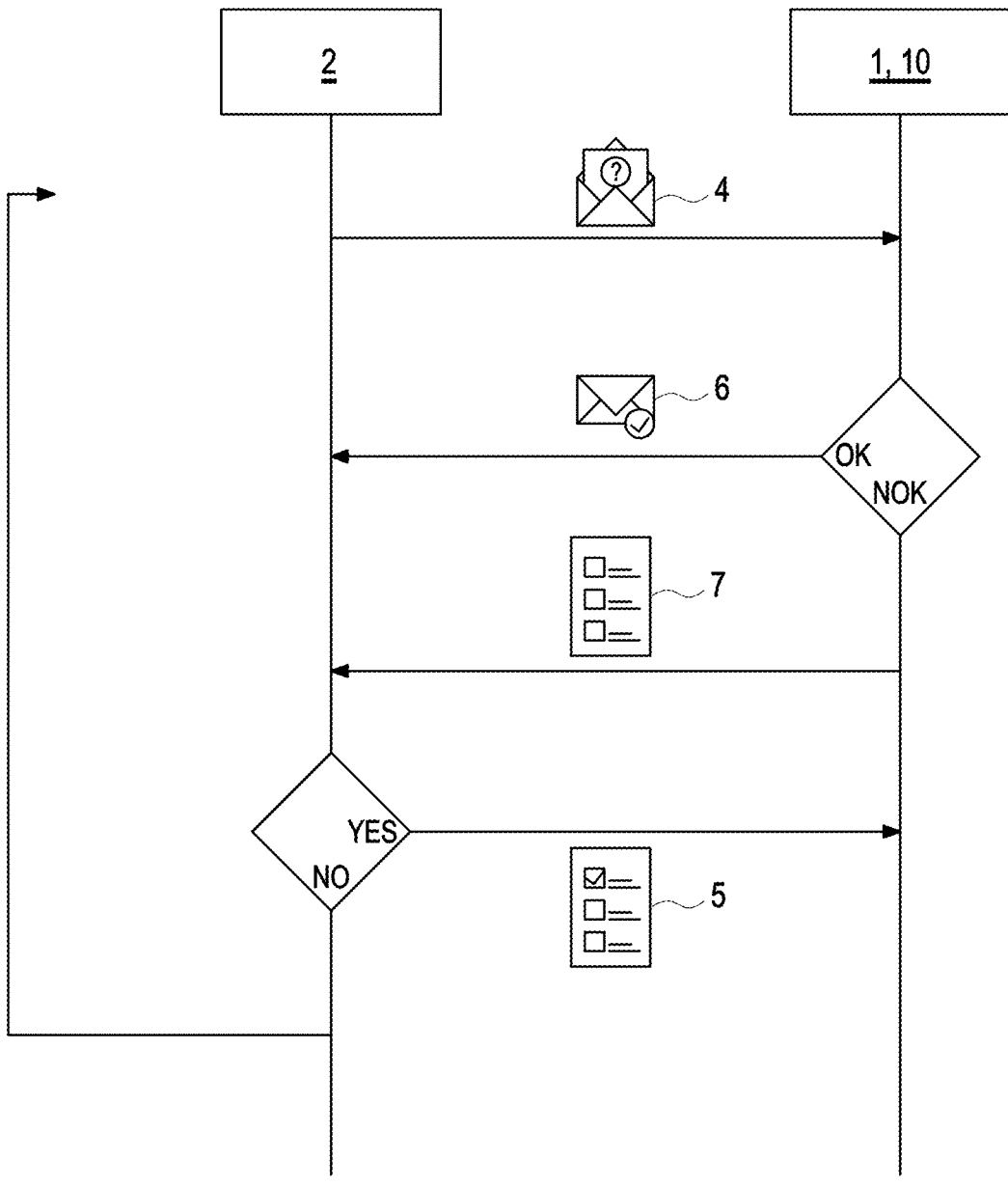
FIG. 2 schematically shows a flowchart of a method according to an embodiment of the invention for operating the cellular network shown in FIG. 1.

FIG. 2 schematically shows a flowchart of a method according to an embodiment of the invention for operating the cellular network 8 shown in FIG. 1.

The teleoperation server 2 remotely operates a vehicle fleet on the road network 3 via wireless connections 80 provided by the cellular network 8.

The network node 1 of the cellular network 8 receives a route request 4 from the teleoperation server 2. The received route request 4 comprises a starting position of a vehicle 9 of the vehicle fleet, a target location to be reached by the vehicle 9, a teleoperation route 30 connecting the target location to the starting position and a travel time of the vehicle 9.

The requested teleoperation route 30 may be determined by the teleoperation server 2. The requested teleoperation route 30 may particularly be determined by minimizing a length of the route. The received route request 4 usually comprises respective starting positions, target locations, routes and travel times of a plurality of vehicles 9.

A teleoperation application executed by the teleoperation server 2 and each vehicle 9 of the vehicle fleet may be caused to automatically adapt a data rate to a current bit rate of the wireless connection 80 by the cellular network 8.

When the cellular network 8 does not allow for a safe remote operation of the vehicle 9 along the requested teleoperation route 30 during the requested travel time, the network node 1 determines an optimal teleoperation route 31 allowing for a safe remote operation of the vehicle 9 from the requested starting position to the requested target location and transmits a route suggestion 7 to the teleoperation server 2. The transmitted route suggestion 7 comprises the optimal teleoperation route 31.

The network node 1 may determine a plurality of intermediate teleoperation routes 32 in between the requested teleoperation route 30 and the determined optimal teleoperation route 31 by applying random variations generated by a Monte Carlo algorithm to the requested teleoperation route 30 or the determined optimal teleoperation route 31. The transmitted route suggestion 7 comprises the determined intermediate teleoperation routes 32.

The network node 1 preferably receives a route decision 5 from the teleoperation server 2. The route decision 5 comprises a suggested teleoperation route 31, 32, stores the suggested teleoperation route 31, 32 and causes the cellular network 8 to reserve corresponding spectral resources of radio cells passed through by the suggested teleoperation route 31, 32.

When the cellular network 8 allows for a safe remote operation of the vehicle 9 along the requested teleoperation route 30 during the requested travel time, the network node 1 may store the requested teleoperation route 30, cause the cellular network 8 to reserve corresponding spectral resources of radio cells passed through by the requested teleoperation route 30 and transmit a route confirmation 6 to the teleoperation server 2.

Determining the optimal teleoperation route 31 preferably comprises assigning weights to sections of roads 33 of the road network 3 and applying a weighted shortest path algorithm to the road network 3. The weighted shortest path algorithm evaluates respective costs of routes connecting the requested target location to the requested starting position by summing up weights assigned to sections of roads 33 of the route. Determining the optimal teleoperation route 31 may also comprise verifying the requested teleoperation route 30.

The weights may be assigned dependent on attributes of the nodes 34 and/or roads 33 of the road network 3. The attributes specify both the road network 3 and the cellular network 8.

The attributes specifying the cellular network 8 exemplarily comprise a radio coverage along a road 33 section, a minimum guaranteed bitrate along a road 33 section, a guaranteed maximum latency along a road 33 section and/or a maximum bit rate along a road 33 section. The attributes specifying the cellular network 8 may be predicted by an artificial neural network 10 and/or via a time series of historic data.

The attributes specifying the road network 3 exemplarily comprise a location of a node 34, a type of a node 34, a length of a road 33, a category of a road 33, a maximum velocity along a road 33 section, a current traffic situation along a road 33 section, an air quality along a road 33 section, a number of lanes of a road 33 section, a direction of a road 33.

The network node 1 favorably determines a key figure for each determined teleoperation route 31, 32 and assigns the determined key figure to the determined teleoperation route 31, 32. The transmitted route suggestion 7 comprises each assigned key figure.

The network node 1 may determine a difference of a travel time along the determined teleoperation route 31, 32 from the requested travel time, a difference of a route length of the determined teleoperation route 31, 32 from a route length of the requested teleoperation route 30 and/or a probability of an undisturbed travel along the determined teleoperation route 31, 32 as the key figure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 network node
10 artificial neural network
2 teleoperation server
3 road network
30 requested teleoperation route
31 optimal teleoperation route
32 intermediate teleoperation route
33 road
34 node

4 route request
5 route decision
6 route confirmation
7 route suggestion
8 cellular network
80 wireless connection
9 vehicle

The invention claimed is:

1. A method, comprising:
remotely operating, by a teleoperation server, a vehicle fleet on a road network via wireless connections provided by a cellular network;
receiving, by a network node of the cellular network, a route request from the teleoperation server, wherein the route request comprises a starting position of a vehicle of the vehicle fleet, a target location to be reached by the vehicle, a teleoperation route connecting the target location to the starting position, and a travel time of the vehicle;
determining, by the network node, a teleoperation route allowing for safe remote operation of the vehicle from the starting position to the target location; and
based on the cellular network not allowing for safe remote operation of the vehicle along the teleoperation route in the route request during the travel time, transmitting, by the network node, a route suggestion to the teleoperation server, wherein the transmitted route suggestion comprises the determined teleoperation route and a plurality of intermediate teleoperation routes in between the teleoperation route in the route request and the determined teleoperation route, wherein the plurality of intermediate teleoperation routes are determined by the network node based on applying random variations generated by a Monte Carlo algorithm to the teleoperation route in the route request or the determined teleoperation route.

2. The method according to claim 1, wherein the network node receives a route decision from the teleoperation server, the route decision comprising a suggested teleoperation route, stores the suggested teleoperation route, and causes the cellular network to reserve corresponding spectral resources of radio cells passed through by the suggested teleoperation route.

3. The method according to claim 1, wherein the network node stores the teleoperation route in the route request, causes the cellular network to reserve corresponding spectral resources of radio cells passed through by the teleoperation route in the route request, and transmits a route confirmation to the teleoperation server based on the cellular network allowing for safe remote operation of the vehicle along the teleoperation route in the route request during the travel time.

4. The method according to claim 1, wherein determining the teleoperation route comprises:
assigning weights to sections of roads of the road network; and
applying a weighted shortest path algorithm to the road network, wherein the weighted shortest path algorithm evaluates respective costs of routes connecting the target location to the starting position by summing up weights assigned to sections of roads of the route.

5. The method according to claim 4, wherein the weights are assigned dependent on attributes of nodes and/or edges of a mathematical graph representing the road network, wherein the attributes specify the road network and the cellular network.

6. The method according to claim 5, wherein the attributes specifying the cellular network comprise:

a radio coverage along a road section, a maximum bit rate along a road section, a minimum guaranteed bitrate along a road section, and/or a guaranteed maximum latency along a road section.

7. The method according to claim 5, wherein the attributes specifying the road network comprise:

a location of a node, a type of a node, a length of a road, a category of a road, a maximum velocity along a road section, a current traffic situation along a road section, an air quality along a road section, a number of lanes of a road section, and/or a direction of a road.

8. The method according to claim 5, wherein the attributes specifying the cellular network are predicted by an artificial neural network and/or via a time series of historic data.

9. The method according to claim 1, wherein the network node determines a key figure for each determined teleoperation route and assigns the determined key figure to the determined teleoperation route, and wherein the transmitted route suggestion comprises the assigned key figure.

10. The method according to claim 9, wherein the network node determines a difference of a travel time along the determined teleoperation route from the travel time, a difference of a route length of the determined teleoperation route from a route length of the teleoperation route in the route request, and/or a probability of undisturbed travel along the determined teleoperation route as the key figure.

11. The method according to claim 1, wherein a teleoperation application executed by the teleoperation server and each vehicle of the vehicle fleet is caused by the cellular network to automatically adapt a data rate to a current bit rate of the wireless connections.

12. The method according to claim 1, wherein the teleoperation server is configured as an edge server.

13. The method according to claim 1, wherein the teleoperation route in the route request is determined by the teleoperation server and/or by minimizing a length of the route.

14. The method according to claim 1, wherein the route request comprises respective starting positions, target locations, routes, and travel times of a plurality of vehicles.

15. A network node of a cellular network, comprising:

a communication interface configured to receive a route request from a teleoperation server remotely operating a vehicle fleet on a road network via wireless connections provided by the cellular network, wherein the route request comprises a starting position of a vehicle of the vehicle fleet, a target location to be reached by the vehicle, a teleoperation route connecting the target location to the starting position, and a travel time of the vehicle; and a processor configured to determine a teleoperation route allowing for safe remote operation of the vehicle from the starting position to the target location;

wherein the communication interface is further configured to, based on the cellular network not allowing for safe remote operation of the vehicle along the teleoperation route in the route request during the travel time, transmit a route suggestion to the teleoperation server, wherein the transmitted route suggestion comprises the determined teleoperation route and a plurality of intermediate teleoperation routes in between the teleoperation route in the route request and the determined teleoperation route, wherein the plurality of intermediate teleoperation routes are determined by the network node based on applying random variations generated by a Monte Carlo algorithm to the teleoperation route in the route request or the determined teleoperation route.

16. A non-transitory computer-readable medium having processor-executable instructions stored thereon, wherein the processor-executable instructions, when executed, facilitate performance of the following:

receiving, by a network node of a cellular network, a route request from a teleoperation server remotely operating a vehicle fleet on a road network via wireless connections provided by the cellular network, wherein the route request comprises a starting position of a vehicle of the vehicle fleet, a target location to be reached by the vehicle, a teleoperation route connecting the target location to the starting position, and a travel time of the vehicle; and determining, by the network node, a teleoperation route allowing for safe remote operation of the vehicle from the starting position to the target location; and based on the cellular network not allowing for safe remote operation of the vehicle along the teleoperation route in the route request during the travel time, transmitting, by the network node, a route suggestion to the teleoperation server, wherein the transmitted route suggestion comprises the determined teleoperation route and a plurality of intermediate teleoperation routes in between the teleoperation route in the route request and the determined teleoperation route, wherein the plurality of intermediate teleoperation routes are determined by the network node based on applying random variations generated by a Monte Carlo algorithm to the teleoperation route in the route request or the determined teleoperation route.

* * * * *